US009201828B2

(12) United States Patent
Sanghai et al.

(10) Patent No.: US 9,201,828 B2
(45) Date of Patent: Dec. 1, 2015

(54) MEMORY INTERCONNECT NETWORK ARCHITECTURE FOR VECTOR PROCESSOR

(71) Applicants: Kaushal Sanghai, Somerville, MA (US); Boris Lerner, Sharon, MA (US); Michael G. Perkins, Edinburgh (GB); John L. Redford, Arlington, MA (US)

(72) Inventors: Kaushal Sanghai, Somerville, MA (US); Boris Lerner, Sharon, MA (US); Michael G. Perkins, Edinburgh (GB); John L. Redford, Arlington, MA (US)

(73) Assignee: Analog Devices, Inc., Norwood, MA (US)

(*) Notice: Subject to any disclaimer, the term of this patent is extended or adjusted under 35 U.S.C. 154(b) by 231 days.

(21) Appl. No.: 13/720,624

(22) Filed: Dec. 19, 2012

(65) Prior Publication Data

US 2014/0115224 A1    Apr. 24, 2014

Related U.S. Application Data

(60) Provisional application No. 61/717,561, filed on Oct. 23, 2012.

(51) Int. Cl.
*G06F 13/38* (2006.01)
*G06F 13/40* (2006.01)
(Continued)

(52) U.S. Cl.
CPC ............ *G06F 13/40* (2013.01); *G06F 9/30007* (2013.01); *G06F 9/3824* (2013.01); *G06F 9/3887* (2013.01); *G06F 13/38* (2013.01); *G06F 13/4022* (2013.01); *G06F 9/3001* (2013.01)

(58) Field of Classification Search
CPC ......... G06F 13/00; G06F 13/14; G06F 13/16; G06F 13/1652; G06F 13/1657; G06F 13/1663; G06F 13/36; G06F 13/38; G06F 13/40; G06F 13/4022; G06F 9/30; G06F 9/3001; G06F 9/30003; G06F 9/30007; G06F 9/345; G06F 9/38; G06F 9/3816; G06F 9/3824; G06F 9/3887; G06F 15/163; G06F 15/173; G06F 15/17318; G11C 5/06

USPC .............. 710/100, 300, 105–106, 316–317; 711/100, 147; 712/2–4, 6, 7–11, 14, 712/21–22, 28–29; 365/63
See application file for complete search history.

(56) References Cited

U.S. PATENT DOCUMENTS 5,247,689 A * 9/1993 Ewert .......................... 710/317
5,355,508 A * 10/1994 Kan .............................. 712/20
(Continued)

FOREIGN PATENT DOCUMENTS

CA    002239426    12/1999
EP    0638867       8/1994
(Continued)

OTHER PUBLICATIONS

Koren & Krishna. "Fault Tolerant Systems". Part 12. Chapter 4. 2007. Morgan-Kaufman.*

(Continued)

*Primary Examiner* — Thomas J Cleary
(74) *Attorney, Agent, or Firm* — Patent Capital Group

(57) ABSTRACT

The present disclosure provides a memory interconnection architecture for a processor, such as a vector processor, that performs parallel operations. An example processor may include a compute array that includes processing elements; a memory that includes memory banks; and a memory interconnect network architecture that interconnects the compute array to the memory. In an example, the memory interconnect network architecture includes a switch-based interconnect network and a non-switch based interconnect network. The processor is configured to synchronously load a first data operand to each of the processing elements via the switch-based interconnect network and a second data operand to each of the processing elements via the non-switch-based interconnect network.

17 Claims, 5 Drawing Sheets

(51) Int. Cl.
*G06F 9/30* (2006.01)
*G06F 9/38* (2006.01)

(56) References Cited

U.S. PATENT DOCUMENTS

| | | | |
|---|---|---|---|
| 5,471,592 A | 11/1995 | Gove et al. | |
| 5,815,680 A | 9/1998 | Okumura et al. | |
| 5,903,771 A | 5/1999 | Sgro et al. | |
| 2002/0016879 A1 | 2/2002 | Miller | |
| 2002/0146025 A1 | 10/2002 | Okina | |
| 2005/0125636 A1* | 6/2005 | Ford et al. | 712/221 |
| 2006/0090025 A1* | 4/2006 | Tufford et al. | 710/305 |
| 2007/0073923 A1 | 3/2007 | Vemula et al. | |
| 2008/0016320 A1 | 1/2008 | Menon et al. | |
| 2009/0083524 A1* | 3/2009 | Van Wel | 712/221 |
| 2010/0082894 A1 | 4/2010 | Hsu et al. | |
| 2011/0022754 A1* | 1/2011 | Cidon et al. | 710/107 |
| 2012/0054379 A1 | 3/2012 | Leung et al. | |
| 2012/0102301 A1 | 4/2012 | Gonion et al. | |
| 2012/0210099 A1 | 8/2012 | Gonion et al. | |
| 2014/0019719 A1* | 1/2014 | Anand et al. | 712/200 |
| 2014/0115195 A1 | 4/2014 | Higham et al. | |
| 2014/0115224 A1 | 4/2014 | Sanghai et al. | |
| 2014/0115275 A1* | 4/2014 | Beers et al. | 711/146 |
| 2014/0115278 A1* | 4/2014 | Redford et al. | 711/150 |
| 2014/0115302 A1 | 4/2014 | Higham et al. | |

FOREIGN PATENT DOCUMENTS

| | | | | |
|---|---|---|---|---|
| EP | 1267256 | | 12/2002 | |
| EP | 1708090 | | 10/2006 | |
| EP | 2725485 | A2 * | 4/2014 | G06F 9/30 |
| WO | 2009/158370 | | 12/2009 | |

OTHER PUBLICATIONS

Hoffman, Jeff, et al. "Architecture of the Scalable Communications Core". Proceedings of the First International Symposium on Networks-on-Chip (NOSC'07). 2007. IEEE. 0-7895-2773-6/07.*
Siegel, Howard Jay. "Interconnection Networks for SIMD Machines". Jun. 1979. IEEE. 0018-9162/79/0600-0057800.75.*
U.S. Appl. No. 14/040,367, filed Sep. 27, 2013.
Non-Final Office Action issued for U.S. Appl. No. 14/040,367 mailed Nov. 14, 2014, 10 pages.
U.S. Appl. No. 14/017,301, filed Sep. 3, 2013.
Extended European Search Report issued for EP 13187959.5 mailed May 15, 2015, 9 pages.
English Summary of Preliminary Rejection issued in Korean Patent Application Serial No. 10-2013-126017 mailed Feb. 25, 2015, 3 pages.
Notice of Preliminary Rejection issued in Korean Patent Application Serial No. 10-2013-118923 mailed May 11, 2015, 4 pages.
English Summary of Notice of Preliminary Rejection issued in Korean Patent Application Serial No. 10-2013-118923 mailed May 11, 2015, 3 pages.
Preliminary Rejection issued in Korean Patent Application Serial No. 10-2013-0126826 mailed Jun. 19, 2015, 3 pages.
English Summary of Preliminary Rejection issued in Korean Patent Application Serial No. 10-2013-0126826 mailed Jun. 19, 2015, 1 page.
Notice of Allowance issued for U.S. Appl. No. 14/040,367 mailed Mar. 18, 2015, 8 pages.
Extended European Search Report issued for EP Patent Application Serial No. 13189405.7 mailed Jul. 9, 2015, 6 pages.

* cited by examiner

MEMORY INTERCONNECT NETWORK ARCHITECTURE FOR VECTOR PROCESSOR

This application is a non-provisional application of U.S. Provisional Patent Application Ser. No. 61/717,561, filed Oct. 23, 2012, which is hereby incorporated by reference in its entirety.

TECHNICAL FIELD

The present disclosure relates generally to processors that perform parallel processing, such as vector processors, and more particularly, to a memory interconnect network architecture for processors that perform parallel processing.

BACKGROUND

Parallel processing, for example that is implemented by a digital signal processor to optimize digital signal processing applications, tends to be intensive in memory access operations. For example, a digital signal processor can operate as a single instruction, multiple data (SIMD), or data parallel, processor. In SIMD operations, a single instruction is sent to a number of processing elements of the digital signal processor, where each processing element can perform a same operation on different data. To achieve high-data throughput, memory organization of DSPs having SIMD architectures (or other processor supporting parallel processing) support multiple, synchronous data accesses. In an example, a processor architecture may include a multi-banked memory interconnected by a memory interconnect network architecture to the processing elements, such that more than one data operand can be loaded for (accessed by) the processing elements during a given cycle.

The memory interconnect network architecture typically includes an interconnection network for every respective parallel data transfer. For example, if two parallel data transfers from the memory to the processing elements are needed to perform an operation, the memory interconnect network architecture implements an interconnection network for transferring a first data set from the memory to the processing elements and another interconnection network for transferring a second data set from the memory to the processing elements. Although existing memory interconnect network architectures for parallel processing have been generally adequate for their intended purposes, they have not been entirely satisfactory in all respects.

BRIEF DESCRIPTION OF DRAWINGS

The present disclosure is best understood from the following detailed description when read with the accompanying figures. It is emphasized that, in accordance with the standard practice in the industry, various features are not drawn to scale and are used for illustration purposes only. In fact, the dimension of the various features may be arbitrarily increased or reduced for clarity of discussion.

OVERVIEW OF EXAMPLE EMBODIMENTS

Figure 1:
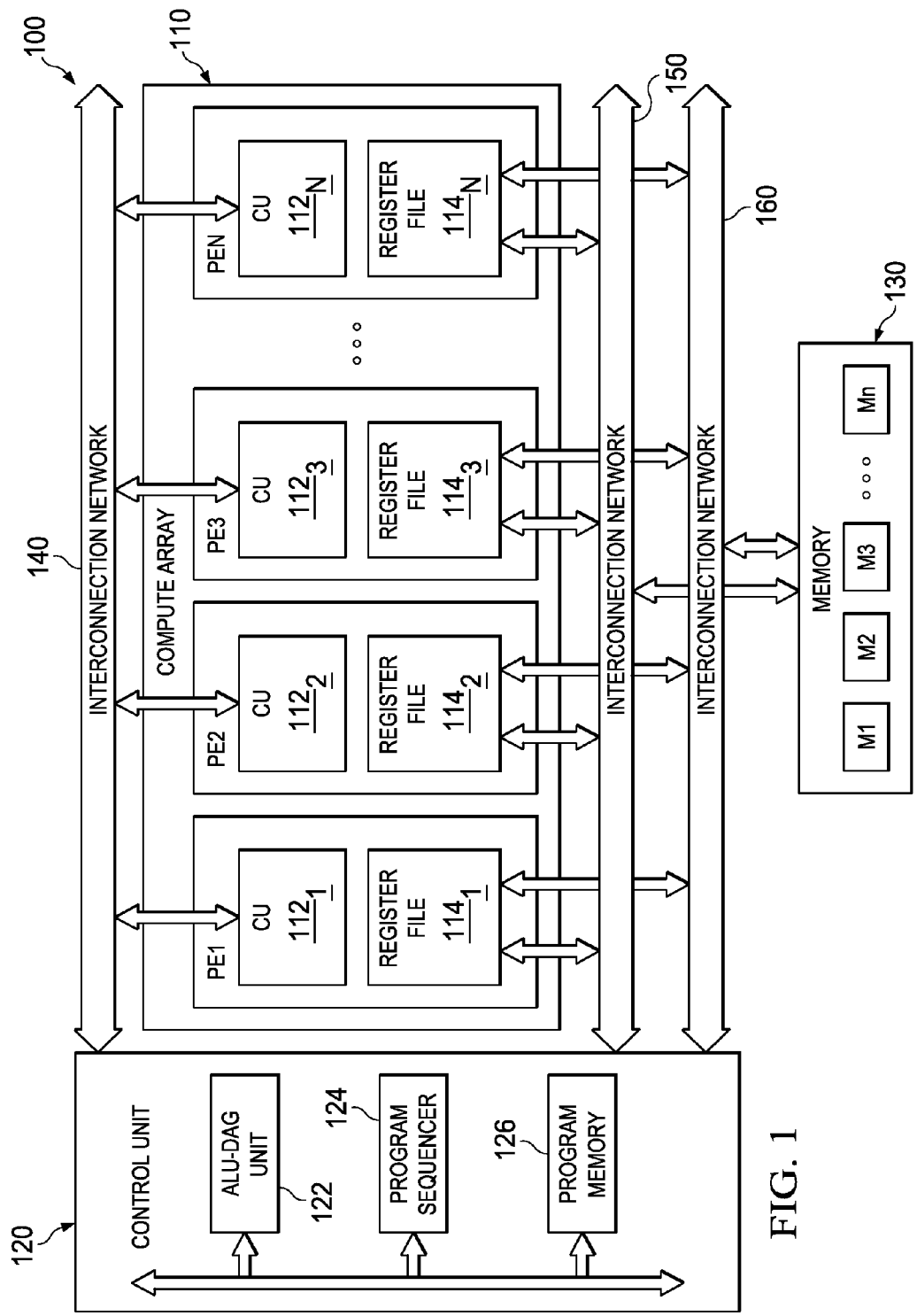
FIG. 1 is a schematic block diagram of an example digital signal processor according to various aspects of the present disclosure.

The present disclosure provides for various processor embodiments to be implemented in any suitable computing environment. One example embodiment provides a memory interconnection architecture for a processor, such as a vector processor, that can perform parallel operations. In some embodiments, a processor may include a compute array that includes processing elements; a memory that includes memory banks; and a memory interconnect network architecture that interconnects the compute array to the memory. At least some of the processing elements may include a compute unit and a register file. In an example, each processing element includes a compute unit and a register file. The memory interconnect network architecture may include a switch-based interconnection network and a non-switch based interconnection network, and the processor is configured to synchronously load a first data operand to at least some of the processing elements via the switch-based interconnection network and a second data operand to at least some of the processing elements via the non-switch-based interconnection network.

In an example configuration, the switch-based interconnection network is a crossbar and the non-switch-based interconnection network is a bus. In various implementations, the first data operand is a different data operand for each processing element and the second data operand is a same data operand for each processing element. In various implementations, the compute array has N processing elements; the memory has n memory banks; and the crossbar network has N×n switches. In various implementations, n=N×a number of synchronous data operand loads performed by the processor. In an example configuration, the processor is configured to synchronously load a first data operand to each of the processing elements via the switch-based interconnection network and a second data operand to each of the processing elements via the non-switch-based interconnection network.

In some embodiments, a processor may include a compute array having N processing elements; a memory having n memory banks; a crossbar that interconnects the compute array and the memory; and a bus that interconnects the compute array and the memory. Each of the N processing elements may include a compute unit and a register file. The crossbar is configured to transfer data from the n memory banks to the N processing elements, and the bus is configured to transfer data from the n memory banks to the N processing elements. The crossbar and the bus are configured to synchronously transfer the data from the n memory banks to the N processing elements. In various implementations, the crossbar has N×n switches, and the bus is free of a switch. In various implementations, the crossbar is configured to transfer a different data operand to each of the N processing elements and the bus is configured to transfer a same data operand from the memory to the N processing elements. In various implementations, n=N×a number of synchronous data transfers performed by the processor.

In some embodiments, a method for operating the processors described herein includes issuing a set of instructions to the processing elements; based on the set of instructions, synchronously transferring a first data operand via a switch-based interconnect network to the processing elements and a second data operand via a non-switch-based interconnect network to the processing elements; and performing, by the processing elements, an operation using the first data operand and the second data operand. In various implementations, transferring the first data operand may include performing a broadcast load, where a same data operand is transferred from the memory to each processing element; and transferring the second data operand may include performing a single instruction multiple data (SIMD) load, where a different data operand is transferred from the memory to each processing element. In various implementations, the operation is one of a finite response filter operation and a matrix-multiply operation. In various implementations, the operation may be other algorithms compatible with a synchronous SIMD and broadcast load.

DETAILED DESCRIPTION OF EXAMPLE EMBODIMENTS

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

FIG. 1 is a schematic block diagram of an example digital signal processor 100 according to various aspects of the present disclosure. FIG. 1 has been simplified for the sake of clarity to better understand the inventive concepts of the present disclosure. Additional features can be added in digital signal processor 100, and some of the features described below can be replaced or eliminated in other embodiments of digital signal processor 100.

Digital signal processor 100 may include a compute array 110, a control unit 120, and a memory 130. In an example, the compute array 110 and the control unit 120 constitute a core processor that can perform computation and data processing functions of digital signal processor 100. Digital signal processor 100 can include other components, such as a microcontroller for executing microcontroller instructions, a direct memory access (DMA) unit, and various interfaces to off-chip devices.

The compute array 110 may include processing elements PE1, PE2, PE3, . . . PEN, where N is a total number of processing elements of the computer array 110. In an example, the compute array 110 may include four processing elements (in other words, PE1, PE2, PE3, and PE4, where N=4). The processing elements PE1, PE2, PE3, . . . PEN perform numeric processing for digital signal processing algorithms. The processing elements PE1, PE2, PE3, . . . PEN operate independently, in parallel, or as a single instruction multiple data (SIMD) engine. In the present example, each processing element PE1, PE2, PE3, . . . PEN is a vector processor. Alternatively, the processing elements PE1, PE2, PE3, . . . PEN are a combination of scalar processors and vector processors.

Each processing element PE1, PE2, PE3, . . . PEN includes a respective computation unit (CU) $112_1, 112_2, 112_3, \ldots 112_N$ and a respective register file $114_1, 114_2, 114_3, \ldots 114_N$. In the depicted embodiment, the computation units $112_1, 112_2, 112_3, \ldots 112_N$ are identical, and the register files $114_1, 114_2, 114_3, \ldots 114_N$ are identical, although the present disclosure contemplates embodiments where the computation units and the register files are not identical. The present disclosure further contemplates configurations where one or more of the processing elements PE1, PE2, PE3, . . . PEN do not include a computation unit and/or register file. In the present example, the computation units $112_1, 112_2, 112_3, \ldots 112_N$ include an arithmetic logic unit (ALU), a multiplier-accumulator (MAC), a shifter, other computational unit, or combinations thereof. The ALU can perform arithmetic and logic operations, such as add, subtract, negate, increment, decrement, absolute value, AND, OR, EXCLUSIVE OR, NOT, divide primitive, other arithmetic operations, other logic operations, or combinations thereof. The MAC can perform multiplication operations as well as multiply and accumulate operations, such as single-cycle multiply, multiply/add, multiply/subtract, other operations, or combinations thereof. The shifter can perform logical and arithmetic shifts, bit manipulations, normalization, denormalization, derive-exponent operations, other operations, or combinations thereof. The various arithmetic operations, logic operations, and other operations can be performed on both fixed-point and floating-point formats. The register files transfers data between the processing elements PE1, PE2, PE3, . . . PEN and data interconnection networks (such as interconnection network 150 and interconnection network 160, described in detail below) and stores results. In an example, each register file includes a primary set of registers (for example, a set of sixteen registers) and a secondary set of registers (for example, another set of sixteen registers). The ALU, MAC, and shifter also each include registers in various embodiments.

The control unit 120 facilitates program execution of digital signal processor 100. The control unit 120 may include an arithmetic logic unit and data address generation (ALU-DAG) unit 122, a program sequencer 124, and a program memory 126. The control unit 120 can include other components, such as an instruction cache, a timer, and an instruction register. The ALU-DAG unit 122 supports general purpose integer computations and supplies addresses for memory addresses. For example, the ALU-DAG 122 provides memory addresses when data is transferred between memory (such as the memory 130) and registers (such as register files $114_1, 114_2, 114_3, \ldots 114_N$). The ALU-DAG unit 122 can supply addresses to data memory (for example, memory 130) and/or program memory 126. The program sequencer 124 provides instruction addresses to program memory 126 for instruction fetches. The program memory 126 stores programs that digital signal processor 100 implements to process data (such as that stored in the memory 130) and can also store process data. The programs include instruction sets having one or more instructions, and digital signal processor 100 implements the programs by fetching the instructions, decoding the instructions, and executing the instructions. In an example, the programs may include instruction sets for implementing various digital signal processing algorithms.

The memory 130 stores information/data to be processed by digital signal processor 100 (data memory), programs implemented by digital signal processor 100 to process the information/data (program memory), or a combination thereof. In the depicted embodiment, the memory 130 has a multi-banked interleaved memory structure, such that the memory 130 includes memory banks M1, M2, M3, . . . Mn, where n is a total number of memory banks of the memory 130. The multi-banked interleaved memory structure supports low latency, high bandwidth parallel level one (L1) memory access (it is noted that L1 memories typically operate at full speed of digital signal processor 100 with little to no latency). In an example, the memory 130 is a random access memory, such as a static random access memory (SRAM). In an example, one or more of the memory banks M1, M2, M3, . . . Mn is a separate SRAM.

An interconnection network 140, an interconnection network 150, and an interconnection network 160 interconnect the compute array 110, the control unit 120, and the memory 130, thereby providing communication pathways between the compute array 110, the control unit 120, and the memory 130. The interconnection network 140, interconnection network 150, and interconnection network 160 include a single bus, multiple buses, a crossbar network, a single-stage network, a multistage network, other type of interconnection network, or combination thereof. The control unit 120 issues instructions and data addresses to the compute array 110 via the interconnection network 140. The interconnection network 140 thus transfers addresses for instructions and data to the various processing elements PE1, PE2, PE3, . . . PEN via the interconnection network 140. The interconnection networks 150 and 160 transfer data and/or instructions from memory (such as memory 130, program memory 126, other memory, or combination thereof), such that contents of any register in digital signal processor 100 can be transferred to any other register or to any memory location and the memory 130 can provide data operands (values) to the compute array 110.

Programming requirements often necessitate that any of the processing elements PE1, PE2, PE3, . . . PEN have access to any of the memory banks M1, M2, M3, . . . Mn. An interconnection network between the memory banks and the processing elements supports such flexible access. For example, in digital signal processor 100 of FIG. 1, the interconnection networks 150 and 160 interconnect the compute array 110 with the memory 130, such that any of the processing elements PE1, PE2, PE3, . . . PEN can communicate with (or access) any of the memory banks M1, M2, M3, . . . Mn. The number of memory banks along with the number of interconnection networks increases as a number of parallel load instructions increases. For example, a digital signal processor can issue and execute the following load instruction with a single interconnection network (such as interconnection network 150) and a number of memory banks equivalent to the number of processing elements (in the present example, where there are four PEs, n=N=4):

$ld\ R0 = [A0 +\!\!= 1],$ which directs the digital signal processor to load register R0 with a data operand located at a memory address held in address register A0. Subsequently, the address in A0 is incremented by 1. In furtherance of the example, to issue and execute the following load instruction, where two load instructions are issued in parallel, the digital signal processor needs two interconnection networks (one for each data load, such as interconnection network 150 and interconnection network 160) and a number of memory banks equivalent to double the number of processing elements (in the example where there are four PEs, n=2×N=2×4=8 memory banks (M1-M8)):

$ld\ R0 = [A0 +\!\!= 1] || ld\ R1 = [A1 +\!\!= 1],$ which directs the digital signal processor to load a data register R0 with a data operand located at a memory address held in address register A0 and to load data register R1 with a data operand located at a memory address held in address register A1. Subsequently, the addresses in A0 and A1 are incremented by 1. In even furtherance of the example, for each PE1, PE2, PE3, . . . PEN of the digital signal processor to perform one 32-bit MAC/cycle (multiply-and-accumulate per cycle), two parallel memory loads are necessary to achieve approximately 100% utilization of the compute resources of the digital signal processor. For example, consider a simple finite impulse response (FIR) filter kernel for a multiply-and-accumulate operation, where an innermost loop with sample vector x and vector taps can be written as follows in C/C++ programming language:

```
for(int i = 0; i < numTaps; i++)
    sum += x[i + j] * taps[i];
```

For this FIR filter kernel, to sustain the multiply-and-accumulate operation for one MAC/cycle, the FIR kernel loop needs two parallel loads, a load of a value for vector x and a load of a value for vector taps. The digital signal processor thus needs two interconnection networks (one to load the value for vector x and one to load the value for vector taps) and a number of memory banks equivalent to double the number of processing elements (in the example where there are four PEs, n=2×N=2×4=8 memory banks (M1-M8)).

Figure 3:
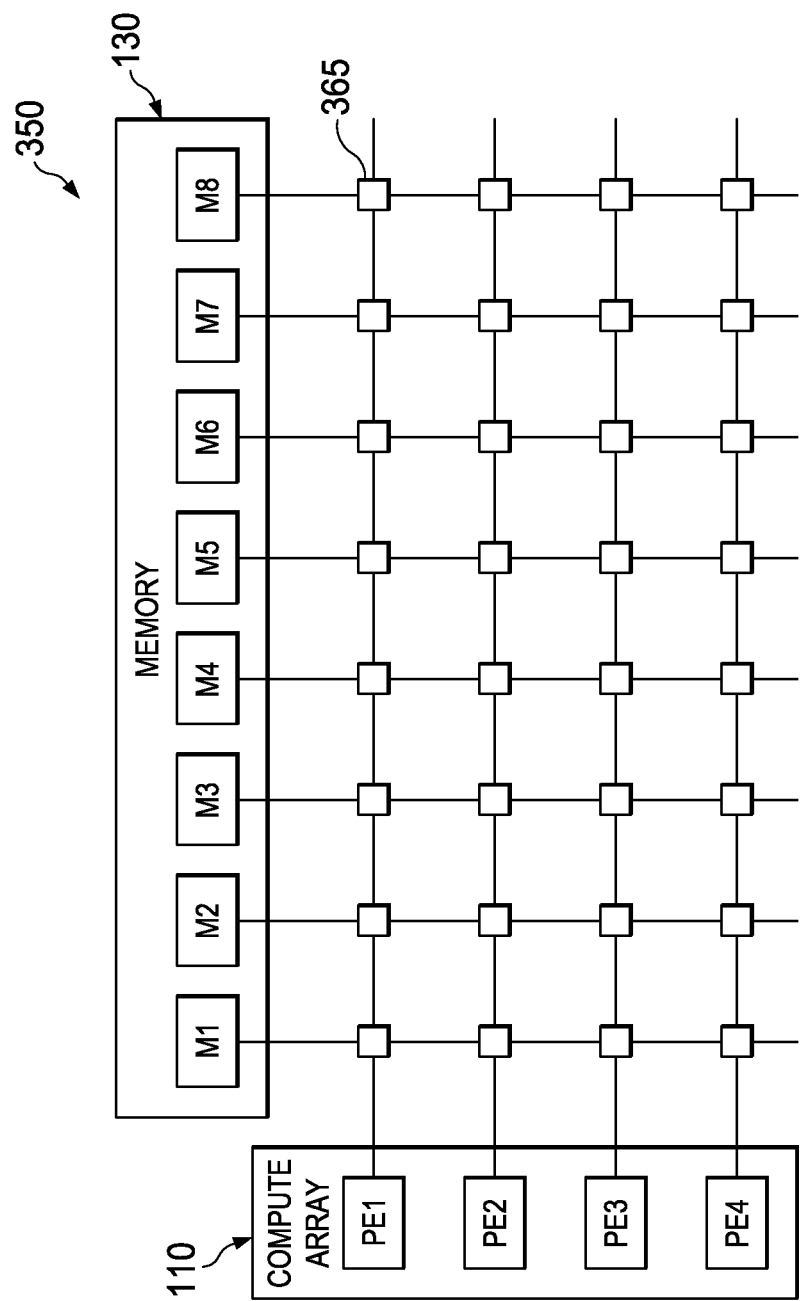
FIG. 3 is a schematic block diagram illustrating an example crossbar that interconnects various features of a digital signal processor, such as a compute array and a memory of the digital signal processors of FIGS. 1 and 2, according to various aspects of the present disclosure.

To improve computing resource efficiency, the interconnection network 150 and the interconnection network 160 support digital signal processor 100 issuing and executing multiple load instructions in parallel, such as those described above. In the depicted embodiment, to facilitate the parallel loads, digital signal processor 100 necessitates that the interconnection network 150 and the interconnection network 160 are switch-based interconnect networks, such as crossbar networks, single-stage networks, multi-stage networks, or other switch-based network. In the depicted example, the interconnection network 150 and the interconnection network 160 are full crossbars, meaning the crossbars have a number of switches equivalent to the number of processing elements multiplied by the number of memory banks (in other words, number of switches=N×n). As discussed above, assuming the compute array 110 has four processing elements (PE1-PE4, where N=4) and the memory 130 has eight memory banks (M1-M8, where n=2*N=2*4=8), FIG. 3 is a schematic block diagram illustrating an exemplary crossbar 350 that can be implemented as the interconnection networks 150 and 160 according to various aspects of the present disclosure. The crossbar 350 includes N×n switches 365 (here, where N=4 and n=8, the number of switches is 32). FIG. 3 has been simplified for the sake of clarity to better understand the inventive concepts of the present disclosure. Additional features can be added in the crossbar 350, and some of the features can be replaced or eliminated in other embodiments of the crossbar 350.

Using the memory interconnect network architecture (the interconnection networks 140, 150, and 160), during a single cycle, at least some of the processing elements PE1, PE2, PE3, . . . PEN accesses an instruction (via interconnection network 140) and accesses two data operands from memory (via interconnection networks 150 and 160). When in single instruction multiple data (SIMD) mode, the processing elements PE1, PE2, PE3, . . . PEN execute the same instruction, but operate on different data. For example, in operation of digital signal processor 100 of FIG. 1, during a single cycle, the switch-based interconnection networks 150 and 160 (such as full crossbars) facilitate two synchronous, parallel single instruction, multiple data (SIMD) loads, where each processing element PE1, PE2, PE3, . . . PEN is directed to load a different data operand from the memory 130.

Digital signal processor 100 can thus perform various parallel operations using its memory interconnect network architecture. For example, in a single cycle, digital signal processor 100 can dispatch a single instruction to processing elements PE1, PE2, PE3, . . . PEN via interconnection network 140; load N data sets from memory (memory 130, program memory 126, other memory, or combination thereof) via the interconnection network 150 and the interconnection network 160, one data set for any of the processing element PE1, PE2, PE3, . . . PEN (in an example, each data set may include two data operands); execute the single instruction synchronously in processing elements PE1, PE2, PE3, . . . PEN; and store data results from the synchronous execution in memory (memory 130, program memory 126, other memory, or combination thereof). The memory interconnect network architecture of FIG. 1 provides support for SIMD loads of unity stride access, non-unity stride access, and/or indexed array access, allowing loading of contiguous and/or non-contiguous data elements in the memory 130.

Since a size of the interconnection network grows as the number of processing elements increases (in cases where the number of processing elements equals the number of memory banks, the interconnection network grows as a square of the number of processing elements), the interconnection network area and power budget become quite dominant as the number of processing elements increases. Accordingly, in the depicted embodiment of digital signal processor 100 in FIG. 1, the memory interconnect network architecture including the switch-based interconnection networks 150 and 160 (specifically, two full crossbars) is expensive. As described above, for N processing elements and n banks, each full crossbar uses N×n switches (and where N=n, N^2 switches). Since a full crossbar is wire dominated, full crossbars having more switches results in longer wires and larger area, which results in higher communication costs, higher power consumption, and lower clock rates (in other words, degraded performance). Accordingly, a way for avoiding the need for two switch-based interconnection networks (such as two full crossbars) while maintaining the digital signal processor's performance is desired.

The present disclosure recognizes that, oftentimes, digital signal processing algorithms (such as finite impulse response (FIR) algorithms, matrix-multiply algorithms, etc.) implemented by a digital signal processor direct the processing elements PE1, PE2, PE3, . . . PEN to load a data operand from a same memory location. In other words, each processing element receives a same data value from a same address from a same memory bank (for example, a data value from a same address of memory bank M1). Such memory loads, referred to as broadcast loads, do not use a full capacity of the interconnection network connecting the compute array 110 to the memory 130. For example, only 1/Nth of the full crossbar is used for the broadcast load operation.

The present disclosure thus proposes modifying the memory interconnect network architecture of digital signal processor 100 by replacing one of the switch-based interconnection networks with a non-switch-based interconnection network, such as a bus-based interconnection network. In particular, as described below, one of the full crossbars is replaced with a single broadcast bus. In various implementations, each switch-based interconnection network is replaced with a non-switch-based interconnection, such as a bus-based interconnection network, where a memory load associated with such interconnection network can be achieved via a broadcast load, as described below.

Figure 2:
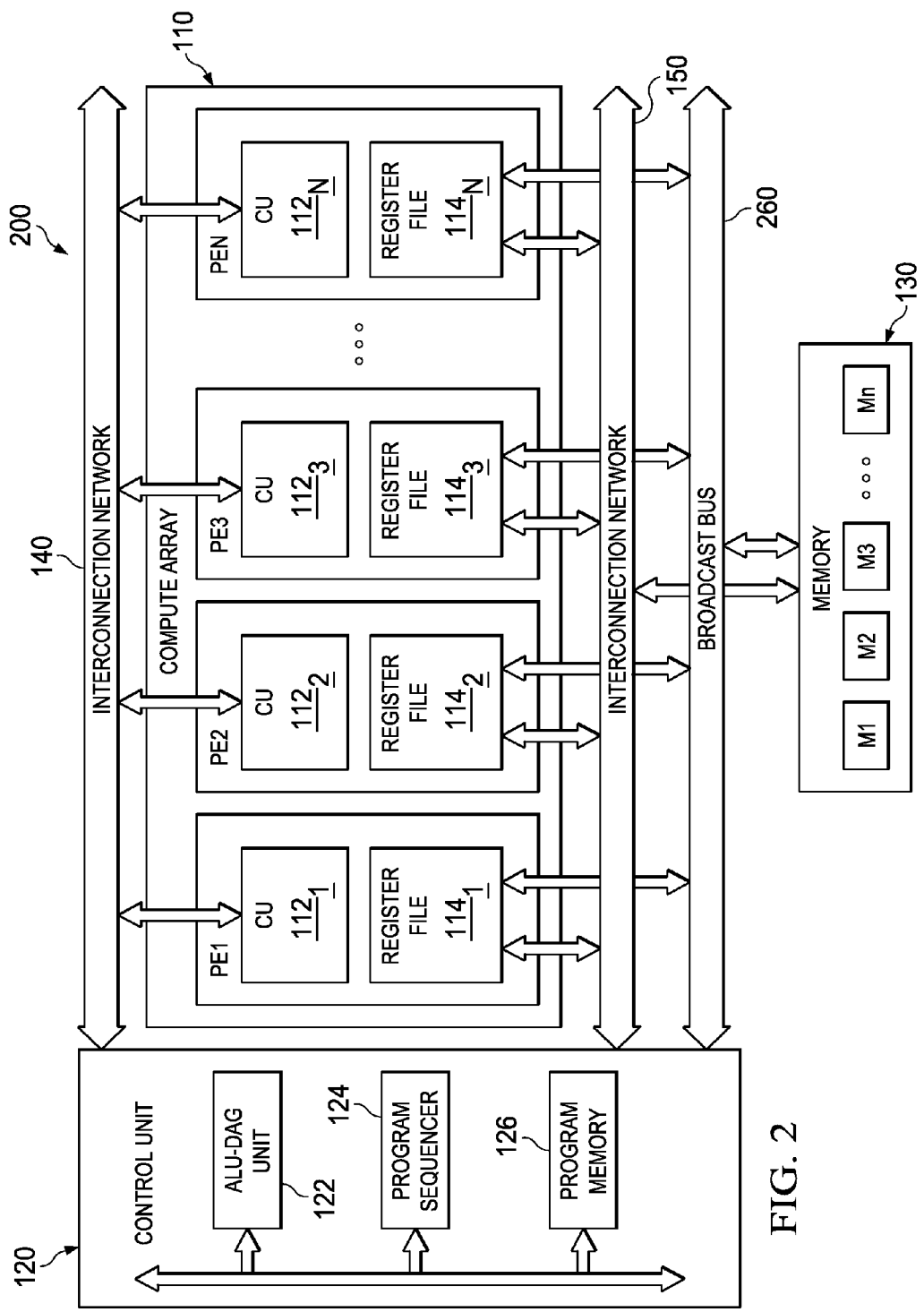
FIG. 2 is schematic block diagram of an example digital signal processor according to various aspects of the present disclosure.

FIG. 2 is a schematic block diagram of a digital signal processor 200 according to various aspects of the present disclosure. FIG. 2 has been simplified for the sake of clarity to better understand the inventive concepts of the present disclosure. The embodiment of FIG. 2 is similar in many respects to the embodiment of FIG. 1. Accordingly, similar features in FIG. 1 and FIG. 2 are identified by the same reference numerals for clarity and simplicity. Additional features can be added in the digital signal processor 200, and some of the features described below can be replaced or eliminated in other embodiments of the digital signal processor 200.

Similar to digital signal processor 100 of FIG. 1, the switch-based interconnection network 150 interconnects the processing elements PE1, PE2, PE3, . . . PEN with the memory banks M1, M2, M3, . . . Mn, such that any of the processing elements PE1, PE2, PE3, . . . PEN can communicate with (or access) any of the memory banks M1, M2, M3, . . . Mn. In contrast to digital signal processor 100 of FIG. 1, the digital signal processor 200 of FIG. 2 replaces the switch-based interconnection network 160 with a non-switch-based interconnection network 260, such as a bus-based interconnection network. The non-switch-based interconnection network 260 also interconnects the processing elements PE1, PE2, PE3, . . . PEN with the memory banks M1, M2, M3, . . . Mn, such that any of the processing elements PE1, PE2, PE3, . . . PEN can communicate with (or access) any of the memory banks M1, M2, M3, . . . Mn. It is noted that both the switch-based interconnection network 150 and the non-switch-based interconnection network 260 can be designed so that both can access any of the memory banks M1, M2, M3, . . . Mn, such that there are no restrictions on where vectors can be mapped during operation of the digital signal processor 200.

Figure 4:
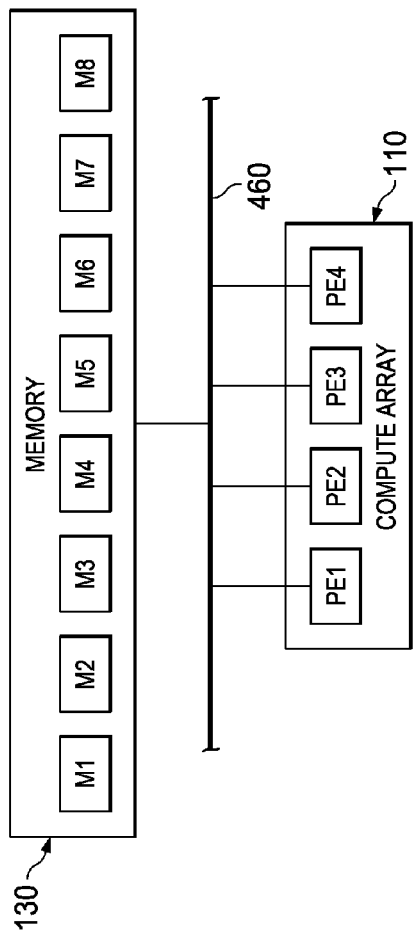
FIG. 4 is a schematic block diagram illustrating an example broadcast bus that interconnects various features of a digital signal processor, such as a memory and a compute array of the digital signal processor of FIG. 2, according to various aspects of the present disclosure.

In an example, the non-switch-based interconnection network 260 is a single broadcast bus. FIG. 4 is a schematic block diagram illustrating an exemplary broadcast bus 460 that can be implemented as the non-switch-based interconnection network 260 according to various aspects of the present disclosure. The broadcast bus 460 is free of switches. In an example, the broadcast bus 460 is a single 32-bit, a single 64-bit broadcast bus, or a single 128-bit broadcast bus that feeds data from the memory banks M1, M2, M3, . . . Mn of the memory 130 to the processing elements PE1, PE2, PE3, . . . PEN of the compute array 130. Alternatively, the broadcast bus 460 is another size depending on data size transfer requirements of the digital signal processor 200. FIG. 4 has been simplified for the sake of clarity to better understand the inventive concepts of the present disclosure. Additional features can be added in the broadcast bus 460, and some of the features can be replaced or eliminated in other embodiments of the broadcast bus 460.

The non-switch-based interconnection network 260 facilitates broadcast loads, where at least some of the processing elements PE1, PE2, PE3, . . . PEN receives a same data operand from the memory 130. In an example, the non-switch-based interconnection network 260 facilitates a broadcast load where each processing element PE1, PE2, PE3, . . . PEN receives a same data operand from the memory 130. Accordingly, in operation of the digital signal processor 200 of FIG. 2, during a single cycle, the interconnection network 150 facilitates an SIMD load, where at least some of the processing elements PE1, PE2, PE3, . . . PEN are directed to load a different data operand from the memory 130; and the interconnection network 260 facilitates a broadcast memory load, where at least some of the processing elements PE1, PE2, PE3, . . . PEN are directed to load a same data operand from the memory 130 (in other words, the processing elements load a same data value from a same address in a same bank of the memory). In an example, during a single cycle, the interconnection network 150 facilitates an SIMD load, where each processing element PE1, PE2, PE3, . . . PEN is directed to load a different data operand from the memory 130; and the interconnection network 260 facilitates a broadcast memory load, where each processing element PE1, PE2, PE3, . . . PEN is directed to load a same data operand from the memory 130 (in other words, each processing element loads a same data value from a same address in a same bank of the memory).

By implementing the memory interconnect architecture of FIG. 2 (in particular a full crossbar and a broadcast bus), area and power requirements of the processor are significantly reduced while maintaining performance for key algorithms for digital signal processing applications. For example, the modified memory interconnect network architecture maintains close to 100% efficiency in terms of compute resource utilization and meets bandwidth requirements for most digital signal processing algorithms. It is noted that, using the memory interconnect network architecture of digital signal processor 200 (where the switch-based interconnection network 150 facilitates SIMD loads and the non-switch-based interconnection network 160 facilitates broadcast loads), digital signal processing algorithms that necessitate two SIMD loads, such as a dot product algorithm, will use two cycles to load the data operands for the dot product operation. In particular, during a first cycle, a first data operand will be transferred via the interconnection network 150 from the memory 130 to at least some of the processing elements PE1, PE2, PE3, . . . PEN (in an example, each processing element PE1, PE2, PE3, . . . PEN), and then during a second cycle, a second data operand will be transferred via the interconnection network 150 from the memory 130 to at least some of the processing elements PE1, PE2, PE3, . . . PEN (in an example, each processing element PE1, PE2, PE3, . . . PEN). Although such algorithms can slow down processing time by necessitating two cycles, the area, power, and cost savings resulting from the memory interconnect network architecture of digital signal processor 200 balances such effects. Different embodiments may have different advantages, and no particular advantage is necessarily required of any embodiment.

The digital signal processor 200 can detect a broadcast operation using its hardware (system architecture) alone, such that the hardware of the digital signal processor detects when to use the broadcast bus 260 for a broadcast load from memory 130. In implementations where the hardware of the digital signal processor 200 detects broadcast operations, inner loop code generated by the compiler of the digital signal processor 200 may looks as follows:

loop_start: V2+=V0*V1||V1=[A1+=8]||V0=[A2+=A3];

if nlc0e, jump loop_start||V6+=v7*v8||v7=[A4+-4]
||v8=[A5+=A3];

Such sequence does not include a broadcast instruction. In some implementations, the digital signal processor 200 can be programmed with a broadcast instruction, which may be architecture dependent, so that it knows when to use the broadcast bus 260 for a broadcast load from memory 130. For example, the following provides an exemplary code using C/C++ programming language for a matrix multiplier algorithm, where a matrix A (matA) having a matrix size of r1×c1 is multiplied with a matrix B (matB) having a matrix size of c1×c2 to determine a product matrix C (matC) having a matrix size of r1×c2.

```
void sp_mat_mul(const float *matA,
        int r1,
        int c1,
        float *matB,
        int c2,
        float *matC) {
    for (int i = 0; i < r1; ++i) {
        for (int j = PE; j < c2; j += NPE) {
            float mr = 0;
            for (int k = 0; k < c1; ++k) {
                float a = matA[i * c1 + k];
                float b = matB[j + k * c2]);
                mr = += a * b;
            }
            matC[i * c2 + j]) = mr;
        }
    }
}
```

In the matrix multiplier algorithm, the exemplary code specifies that the j index is different for each processing element (PE) (for (int j=PE; j<c2; j+=NPE)) and that the k index is the same for each processing element (for (int k=0; k<c1; ++k)). In various implementations, the broadcast instruction can simplify the architecture of the digital single processor 200.

Figure 5:
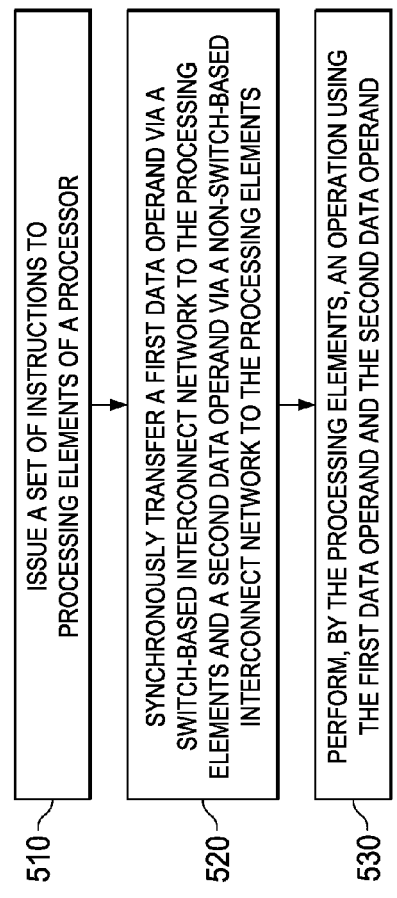
FIG. 5 is a flowchart of an example method that can be implemented by a digital signal processor, such as the digital signal processor of FIG. 2, according to various aspects of the present disclosure.

FIG. 5 is a flowchart of a method 500 that can be performed by a processor according to various aspects of the present disclosure. For example, the method 500 can be performed by the digital signal processor 200 having the memory interconnect architecture including the switch-based interconnection network (for example, crossbar) and the non-switch-based interconnection network (for example, bus). The method 500 begins at block 510 where a processor issues a set of instructions to processing elements of the processor. For example, as described above, the digital signal processor 200 issues a set of instructions, such as parallel memory load instructions, to the processing elements PE1, PE2, PE3, . . . PEN. At block 520, a first data operand is transferred to at least some of the processing elements via the switch-based interconnection network and a second data operand is transferred to at least some of the processing elements via a non-switch-based interconnection network. In an example, the first data operand is transferred via a SIMD load, where each processing element receives (or accesses) a different data operand, and the second data operand is transferred via a broadcast load, where each processing element receives (or accesses) a same data operand. For example, as described above, a first data operand is transferred from the memory 130 to each processing element PE1, PE2, PE3, . . . PEN via the interconnection network 150, and a second data operand is transferred from the memory 130 to each processing element PE1, PE2, PE3, . . . PEN via the broadcast bus 260. At block 530, the processing elements can perform an operation using the first data operand and the second data operand. For example, as described above, the processing elements PE1, PE2, PE3, . . . PEN use their respective first and second data operands to perform a digital signal processing algorithm, such as a matrix-multiplier algorithm or a fir response filter operation. Additional steps can be provided before, during, and after the method 500 and some of the steps described can be replaced or eliminated for other embodiments of the method 500.

Figure 6:
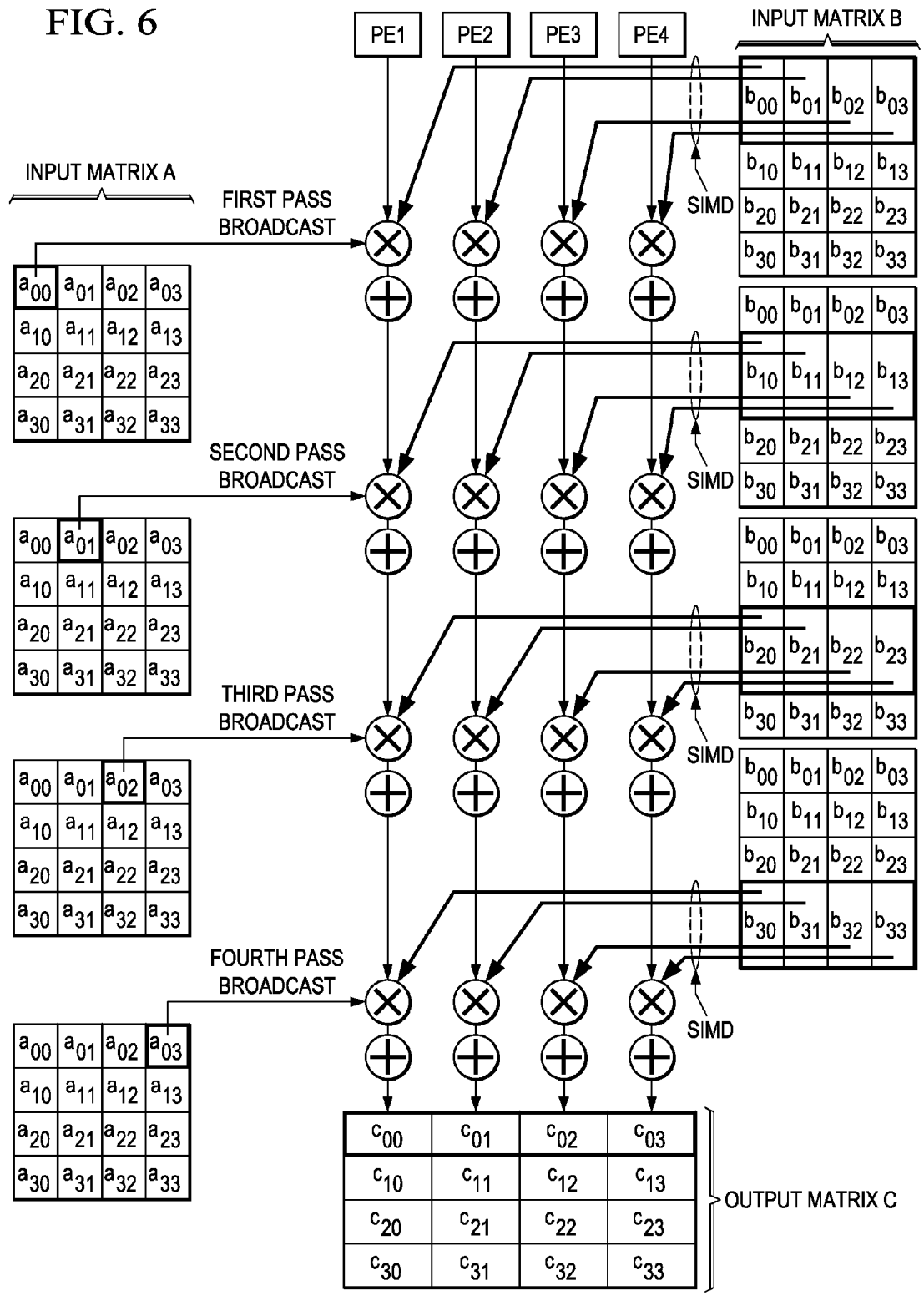
FIG. 6 is a schematic diagram of an example matrix multiplier algorithm implemented by a digital signal processor, such as the digital signal processor of FIG. 2, according to various aspects of the present disclosure.

The memory interconnect network architecture disclosed herein benefits a wide variety of algorithms that can be implemented by the digital signal processor 200, particularly any algorithm that can benefit from a synchronous SIMD load and broadcast load (such as a matrix multiplier algorithm or a fir response filter operation). FIG. 6 is a schematic diagram of an example matrix multiplier algorithm implemented by a digital signal processor, such as the digital signal processor of FIG. 2, according to various aspects of the present disclosure. The matrix multiplier algorithm can be implemented using the exemplary code provided in the description above, where a matrix A (matA) having a matrix size of r1×c1 is multiplied with a matrix B (matB) having a matrix size of c1×c2 to determine a product matrix C (matC) having a matrix size of r1×c2. In FIG. 6, matA is represented by a 4×4 input matrix A (where r1=1, c1=4), matB is represented by a 4×4 input matrix B (where c2=4), and matC is represented by a 4×4 output matrix C. In the running example disclosed herein, where the digital signal processor 200 includes four processing elements (N=4), FIG. 6 schematically illustrates computation of the first row of the output matrix C. For example, in a first pass (such as in a first iteration of an inner loop), the digital signal processor 200 implements a broadcast load to transfer element $a_{00}$ of input matrix A to the processing elements PE1, PE2, PE3, and PE4 via the interconnection network 260 and further implements a SIMD load to transfer elements $b_{00}$, $b_{01}$, $b_{02}$, and $b_{03}$ of input matrix B via the interconnection network 150 respectively to processing elements PE1, PE2, PE3, and PE4. Then, the processing elements PE1, PE2, PE3, and PE4 respectively multiply the same element $a_{00}$ of matrix A by its respective element $b_{00}$, $b_{01}$, $b_{02}$, and $b_{03}$ of input matrix B. Processing continues, in a second pass (such as in a second iteration of the inner loop), the digital signal processor 200 implements a broadcast load to transfer element $a_{01}$ of input matrix A to the processing elements PE1, PE2, PE3, and PE4 via the interconnection network 260 and further implements a SIMD load to transfer elements $b_{10}$, $b_{11}$, $b_{12}$, and $b_{13}$ of input matrix B via the interconnection network 150 respectively to processing elements PE1, PE2, PE3, and PE4. Then, the processing elements PE1, PE2, PE3, and PE4 respectively multiply the same element $a_{01}$ of matrix A by its respective element $b_{10}$, $b_{11}$, $b_{12}$, and $b_{13}$ of input matrix B. Similarly, in a third pass (such as in a third iteration of the inner loop), the digital signal processor 200 implements a broadcast load to transfer element $a_{02}$ of input matrix A to the processing elements PE1, PE2, PE3, and PE4 via the interconnection network 260 and further implements a SIMD load to transfer elements $b_{20}$, $b_{21}$, $b_{22}$, and $b_{23}$ of input matrix B via the interconnection network 150 respectively to processing elements PE1, PE2, PE3, and PE4; and the processing elements PE1, PE2, PE3, and PE4 respectively multiply the same element $a_{02}$ of matrix A by its respective element $b_{20}$, $b_{21}$, $b_{22}$, and $b_{23}$ of input matrix B. Again similarly, in a fourth pass (such as in a fourth iteration of the inner loop), the digital signal processor 200 implements a broadcast load to transfer element $a_{03}$ of input matrix A to the processing elements PE1, PE2, PE3, and PE4 via the interconnection network 260 and further implements a SIMD load to transfer elements $b_{30}$, $b_{31}$, $b_{32}$, and $b_{33}$ of input matrix B via the interconnection network 150 respectively to processing elements PE1, PE2, PE3, and PE4; and the processing elements PE1, PE2, PE3, and PE4 respectively multiply the same element $a_{03}$ of matrix A by its respective element $b_{30}$, $b_{31}$, $b_{32}$, and $b_{33}$ of input matrix B.

At every pass (iteration) of the inner loop, after each multiply operation, the processing elements PE1, PE2, PE3, and PE4 perform an add operation, by adding their respective products to a respective value from the previous iteration (the multiply-add value), where a result variable for adding at the first pass (iteration) is initialized to zero. For example, at the first pass, the processing element PE1 adds the product of the multiply operation to zero; at the second pass, the processing element PE1 adds the product of the multiply operation to the value of the multiply-add operation of the PE1's first pass; at the third pass, the processing element PE1 adds the product of the multiply operation to the value of the multiply-add operation of the PE1's second pass; and at the fourth pass, the processing element PE1 adds the product of the multiply operation to the value of the multiply-add operation of the PE1's third pass; and so on to determine element $c_{00}$ of the output matrix C. Similar multiply-add operations are performed by the other processing elements PE2, PE3, and PE4 to respectively determine element $c_{01}$ of the output matrix C, element $c_{02}$ of the output matrix C, and element $c_{03}$ of the output matrix C. Such processing continues with the elements of input matrix A and input matrix B, using synchronous broadcast and SIMD loads, to determine the remaining elements of the output matrix C. The matrix multiplier algorithm thus greatly benefits from the memory interconnect network architecture of the digital signal processor 200.

Although the present disclosure describes the memory interconnect network architectures with reference to a digital signal processor, the present disclosure contemplates the memory interconnect network architectures described herein for use in any processor that can perform parallel operations, including a microprocessor, a microcontroller, a general purpose computer, or any other processor that can perform parallel operations. The specifications, dimensions, and relationships outlined herein (for example, the number of processing elements and memory banks, logic operations, load values, etc.) have only been offered for purposes of example and teaching only. Each of these may be varied considerably without departing from the spirit of the present disclosure, or the scope of the appended claims. The specifications apply only to one non-limiting example and, accordingly, they should be construed as such. In the foregoing description, example embodiments have been described with reference to particular processor arrangements. Various modifications and changes may be made to such embodiments without departing from the scope of the appended claims. The description and drawings are, accordingly, to be regarded in an illustrative rather than a restrictive sense.

The operations and steps described with reference to the preceding FIGURES illustrate only some of the possible scenarios that may be executed by, or within, digital signal processor 100 and digital signal processor 200 of FIGS. 1 and 2 respectively. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In one example embodiment, digital signal processor 100 and digital signal processor 200 of FIGS. 1 and 2 respectively are coupled to a motherboard of an associated electronic device. The motherboard can be a general circuit board that can hold various components of the internal electronic system of the electronic device and, further, provide connectors for other peripherals. More specifically, the motherboard can provide the electrical connections by which the other components of the system can communicate. Any suitable processors (inclusive of digital signal processors, microprocessors, supporting chipsets, etc.), memory elements, etc. can be suitably coupled to the motherboard based on particular configuration needs, processing demands, computer designs, etc. Other components such as external storage, controllers for video display, sound, and peripheral devices may be attached to the motherboard as plug-in cards, via cables, or integrated into the motherboard itself. In another example embodiment, digital signal processor 100/digital signal processor 200 of FIGS. 1 and 2 respectively may be embedded in stand-alone modules (e.g., a device with associated components and circuitry configured to perform a specific application or function) or integrated as plug-in modules into application specific hardware of electronic devices.

Note that particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may be implemented in software in, for example, control unit 120. In some embodiments, one or more of these features may be implemented in hardware, provided external to the elements of FIGS. 1-4, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, digital signal processor 100 and digital signal processor 200 of FIGS. 1 and 2 respectively described herein (and/or its associated structures) may also include suitable interfaces for receiving, transmitting, and/or otherwise communicating data or information in a network environment. Additionally, some of the components associated with the described processors may be removed, or otherwise consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

In some of example embodiments, one or more memory elements (for example, memory 130, program memory 126, etc.) can store data used for the operations described herein. This includes the memory element being able to store instructions (for example, software, logic, code, etc.) in non-transitory media such that the instructions are executed to carry out the activities described herein.

Any suitable processor component can execute any type of instructions associated with the data to achieve the operations detailed herein. In one example, digital signal processor 100 and digital signal processor 200 of FIGS. 1 and 2 respectively could transform an element or an article (for example, data) from one state or thing to another state or thing. In another example, the activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, digital signal processor 100 and digital signal processor 200 of FIGS. 1 and 2 respectively may keep information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in digital signal processor 100 and digital signal processor 200 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

EXAMPLE EMBODIMENT IMPLEMENTATIONS

One particular example implementation may include means for (for example, software, logic, code, hardware, or a combination thereof) issuing a set of instructions to the processing elements; synchronously transferring a first data operand via a switch-based interconnect network to at least some of the processing elements and a second data operand via a non-switch-based interconnect network to at least some of the processing elements; and performing, by at least some of the processing elements, an operation using the first data operand and the second data operand. Various implementations may further include means for performing a broadcast load where a same data operand is transferred from the memory to each of the at least some processing elements; and transferring the second data operand includes performing a single instruction multiple data (SIMD) load where a different data operand is transferred from the memory to each of the at least some processing elements. Various implementations may include performing one of a finite response filter operation and a matrix-multiply operation.

What is claimed is:

1. A processor, comprising:
a compute array that includes processing elements;
a memory that includes memory banks; and
a memory interconnect network architecture that is to interconnect at least some of the processing elements to at least some of the memory banks, wherein the memory interconnect network architecture includes:
a switch-based interconnection network, and
a non-switch-based interconnection network,
wherein the processor is configured to load a first data operand to at least some of the processing elements via the switch-based interconnection network synchronous with a second data operand to at least some of the processing elements via the non-switch-based interconnection network, wherein the first data operand is a different data operand for each processing element and the second data operand is a same data operand for each processing element.

2. The processor of claim 1, wherein the switch-based interconnection network is a crossbar network.

3. The processor of claim 2, wherein:
the compute array comprises N processing elements;
the memory comprises n memory banks; and
the crossbar network comprises N×n switches.

4. The processor of claim 3, wherein n=N×a number of synchronous data operand loads performed by the processor during a cycle.

5. The processor of claim 2, wherein the non-switch-based interconnection network is a broadcast bus.

6. The processor of claim 5, wherein the broadcast bus is a selected one of a 32-bit bus and a 64-bit bus.

7. The processor of claim 5, wherein the broadcast bus is a single broadcast bus.

8. The processor of claim 1, wherein each processing element includes a compute unit and a register file.

9. The processor of claim 1, wherein the processor is configured to synchronously load the first data operand to each processing element via the switch-based interconnection network and a second data operand to each processing element via the non-switch-based interconnection network.

10. A processor, comprising:
a compute array comprising N processing elements;
a memory comprising n memory banks;
a crossbar that is to interconnect the compute array and the memory, the crossbar configured to transfer data from the n memory banks to the N processing elements;
a bus that is to interconnect the compute array and the memory, the bus configured to transfer data from the n memory banks to the N processing elements; and
wherein the crossbar and the bus are configured to transfer respectively a different data operand synchronously with a same data operand from the memory to the N processing elements.

11. The processor of claim 10, wherein the crossbar has N×n switches.

12. The processor of claim 11, wherein the bus is free of a switch.

13. The processor of claim 10, wherein at least some of the N processing elements includes a compute unit and a register file.

14. The processor of claim 10, wherein the n=N×a number of synchronous data transfers performed by the processor during a cycle.

15. A method to be performed by a processor, which includes a compute array comprising processing elements and a memory, the method comprising:
issuing an instruction to the processing elements;
transferring from the memory a different, first data operand via a switch-based interconnect network to at least some of the processing elements synchronous with a same, second data operand via a non-switch-based interconnect network to at least some of the processing elements; and
performing, by at least some of the processing elements, an operation specified by the instruction using the first data operand and the second data operand.

16. The method of claim 15, wherein:
the switch-based interconnect network is a crossbar; and
the non-switch-based interconnect network is a bus.

17. The method of claim 15, wherein the performing the operation includes performing one of a finite response filter operation and a matrix-multiply operation.

* * * * *